United States Patent [19]

Britt

[11] Patent Number: 5,614,450
[45] Date of Patent: Mar. 25, 1997

[54] SPOUT-FILLING COMPOSITION AND METHOD FOR APPLYING

[76] Inventor: James M. Britt, 3325 Lorna Rd. #2-176, Birmingham, Ala. 35216

[21] Appl. No.: 534,793

[22] Filed: Sep. 27, 1995

[51] Int. Cl.⁶ .................................................. C04B 35/10
[52] U.S. Cl. .......................... 501/120; 501/99; 501/128; 266/45; 222/562; 222/590; 222/591; 222/597; 222/600
[58] Field of Search ........................... 501/120, 99, 133, 501/128; 266/45, 271, 281, 280, 275; 222/562, 563, 590, 591, 597, 600, 601

[56] References Cited

U.S. PATENT DOCUMENTS

| | | | |
|---|---|---|---|
| 2,537,012 | 1/1951 | Austin et al. | 501/120 |
| 4,525,463 | 6/1985 | Dislich et al. | 501/99 |
| 4,780,434 | 10/1988 | Watanabe et al. | 501/120 |
| 4,928,931 | 5/1990 | Dislich et al. | 266/45 |
| 5,124,285 | 6/1992 | Dislich | 501/99 |

OTHER PUBLICATIONS

*Phase Diagrams for Ceramists*, by Levin, Robbins and McMurdie, third edition 1974, copyright 1964 by The American Ceramic Society, phase diagram nos. 259, 260, and 596 (no month).

*Refractories* by F.H. Norton published in 1949 by McGraw–Hill Book Company, Inc., pp. 99, 201, 314, 333 (no month).

*Primary Examiner*—Mark L. Bell
*Assistant Examiner*—Michael Marcheschi
*Attorney, Agent, or Firm*—Michael Drew

[57] ABSTRACT

A spout-filling composition has from about 50% to about 70% by weight magnesium-aluminate spinel aggregate, from about 50% to about 30% by weight quartz sand, and lampblack in an additional amount of from about 0.25% to about 5.00% by weight of the magnesium-aluminate spinel aggregate and quartz sand admixture.

20 Claims, No Drawings

SPOUT-FILLING COMPOSITION AND METHOD FOR APPLYING

TECHNICAL FIELD OF THE INVENTION

The present invention relates to spout-filling compositions for metal-processing ladles, and more particularly to a spout-filling composition which does not contain reducible metal oxides.

BACKGROUND OF THE INVENTION

In metal casting, and in the steel-making process in particular, where molten metal is introduced into a ladle, it is desirable to reduce or eliminate any substances which might cause imperfections in the finished product. In steel making, molten steel may typically contain substances in solution which are known as "reductants" in that they can cause substances such as iron or manganese oxides to reduce to oxides of the reductants. For example, the presence of the reductants aluminum metal, calcium metal or calcium carbide in steel melt will reduce iron and manganese oxides to oxides of aluminum and calcium and calcium aluminates. Aluminum oxide, calcium oxide and calcium aluminate can cause imperfections in finished steel and for this reason their presence is undesirable in the processed steel.

Metal processing ladles (such as metal-casting or metal-forming ladles) commonly employ a spout-filling composition to protect the nozzles of the ladles and assure free opening of the ladle nozzle to remove molten metal. Spout-filling compositions are commonly used for these reasons in steel-making. Chromite sand is a commonly-used constituent of spout-filling compositions used in steel-making ladles. Chromite sand typically contains imperfections. A commonly-occurring imperfection in chromite sand is iron oxide. Interaction between iron oxide in the chromite sand of the spout-filling material and any of the aluminum metal, calcium metal or calcium carbide reductants in solution in the melt is undesirable for the reasons stated above. Thus, it can be appreciated that it would be desirable to have a spout-filling composition which does not contain reducible oxides.

SUMMARY OF THE INVENTION

In the present invention, a spout-filling composition has from about 50% to as much as 100% by weight magnesium-aluminate spinel aggregate and from about 50% to as little as 0% by weight quartz sand. To the spinel aggregate and quartz sand is added lampblack in an amount of from about 0.25% to about 5.00% by weight of the magnesium-aluminate spinel aggregate and quartz sand. The composition of the invention does not contain oxides reducible by the metals typically found in steel melt.

Other aspects, objects, features, and advantages of the present invention will become apparent to those skilled in the art upon reading the detailed description of preferred embodiments.

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following description of preferred embodiments.

In a preferred embodiment of the invention a magnesium-aluminate spinel aggregate which does not naturally contain iron oxide or other metal oxides is the primary component of a spout-filling composition. The magnesium-aluminate spinel aggregate is a particulate refractory which is used in the invention to insulate the spout of a metal-processing ladle from molten metal in the ladle. The magnesium-aluminate spinel aggregate may be combined with quartz sand and/or lampblack, as a carbonaceous substance of choice, to perform an insulating function.

The spinel aggregate of the invention is a magnesium-aluminate spinel aggregate preferably consisting of MgO and $Al_2O_3$. The spinel aggregate may contain as little as 5% actual spinel with the balance being oxides of aluminum or calcium. The spinel aggregate may also contain as much as 100% spinel with only impurity amounts of additional oxides. The ratio of MgO to $Al_2O_3$ in the spinel aggregate of the preferred embodiment ranges from as little as 5% by weight MgO with 95% by weight being $Al_2O_3$ to as much as 95% by weight MgO with 5% by weight being $Al_2O_3$. However, preferred percentage-by-weight ranges of MgO and $Al_2O_3$ are as follows:

MgO: from about 5% to about 30%

$Al_2O_3$: from about 95% to about 70%

The above formulation for spinel aggregate would also be suitable for use in the teachings of the invention when additionally containing up to about 20% by weight of CaO. A preferred spinel formulation is about 10% by weight MgO, about 3% by weight CaO, and about 87% by weight $Al_2O_3$. Reference data regarding spinel-aggregates may be found in phase diagram nos. 259, 260, and 596 of *Phase Diagrams for Ceramists,* by Levin, Robbins and McMurdie, compiled at the National Bureau of Standards, third edition 1974, copyright 1964 by The American Ceramic Society. Information may also be found at pages 99, 201, 314, 333 of *REFRACTORIES* by F. H. Norton published in 1949 by McGraw-Hill Book Company, Inc. By way of example only and not by limitation, a suitable spinel aggregate for use in the teachings of the invention may be purchased from one of the suppliers listed under the heading "SPINEL, Magnesium Aluminate" found at page 93 in the *CERAMIC INDUSTRY DATA BOOK & BUYER'S GUIDE,* Jul. 15, 1993 Volume 141 No. 2 published by the Business News Publishing Co.

Desirable results are obtained when the spinel aggregate is of a spherical morphology and all the particles are of the same diameter. In general, narrow splits of sizes below 10 mesh and above 100 mesh are preferred.

The quartz sand used in the composition of the invention is preferably of at least 97% $SiO_2$ purity, having a particle size on the order of the spinel aggregate.

Various formulations of spinel aggregate and quartz sand work well in the invention. Suitable formulations are as shown in the following table:

| Sample Percentages by Weight of Components of Spout-Filling Composition of Invention | | | |
|---|---|---|---|
| Spinel Aggregate | 50% | 70% | 100% |
| Quartz Sand | 50% | 30% | 0% |

Although a suitable ratio of spinel aggregate to quartz sand may range from a 50—50 mixture to a 100% concentration of spinel aggregate, as shown in the table above, a preferred range of admixture is from about 50% by weight to about 70% by weight spinel aggregate combined with from about 50% by weight to about 30% by weight quartz sand. A suitable spout-filling composition according to preferred embodiments of the invention may also a fine-mesh carbonaceous substance in an additional amount of from about 0.25% to about 5.00% by weight of the spinel-quartz admixture. An example of a suitable carbonaceous substance is graphite, with lampblack being a carbonaceous substance of choice in the preferred embodiment.

The following are examples of preferred formulations of the spout-filling material taught by the invention:

| Material | % by weight | Particle Size |
| --- | --- | --- |
| Example 1 | | |
| magnesium-aluminate spinel aggregate | 80 | from 20 mesh to 40 mesh |
| quartz sand | 20 | from 14 mesh to 35 mesh |
| lampblack | +0.5 (% to be added to above total) | about 100 μm |
| Example 2 | | |
| magnesium-aluminate spinel aggregate | 100 | from 6 mesh to 20 mesh |
| Example 3 | | |
| magnesium-aluminate spinel aggregate | 100 | from 8 mesh to 100 mesh |
| lampblack | +0.5 (% to be added to above total) | about 100 μm |

The spout-filling material of the invention is placed in the closed-off spout of a ladle so as to create a mound above the well block on the floor of the ladle. A cap is formed at what will be the interface of the spout-filling composition and the metal melt so as to support the melt over the spout. The spout is then opened such as by moving a valve mechanism which covers the spout to allow the discharge of the spout-filling composition and melt. Melt discharges as the cap is generally ruptured by the weight of melt upon the cap upon evacuation of the spout-fill composition.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A spout-filling composition comprising:
   a first component having
      from about 50% to about 100% by weight magnesium-aluminate spinel aggregate; and
      from about 50% to about 0% by weight quartz sand; and
   a second component having
      fine-mesh carbonaceous material in an amount of from about 0.25% to about 5.00% by weight of the magnesium-aluminate spinel aggregate and quartz sand component.

2. The spout-filling composition of claim 1 wherein said fine-mesh carbonaceous material is lampblack.

3. The spout-filling composition of claim 2 wherein said lampblack has a particle size of about 100 μm.

4. The spout-filling composition of claim 1 wherein said magnesium-aluminate spinel aggregate comprises from about 5% to about 95% by weight MgO and from about 95% to about 5% by weight $Al_2O_3$.

5. The spout-filling composition of claim 4 wherein said magnesium-aluminate spinel aggregate comprises from about 5% to about 30% by weight MgO and from about 95% to about 70% by weight $Al_2O_3$.

6. The spout-filling composition of claim 4 wherein said magnesium-aluminate spinel aggregate further comprises up to about 20% by weight CaO.

7. The spout-filling composition of claim 6 wherein said magnesium-aluminate spinel aggregate comprises about 10% by weight MgO, about 87% by weight $Al_2O_3$, and about 3% by weight CaO.

8. The spout-filling composition of claim 1 wherein said magnesium-aluminate spinel aggregate is about 70% by weight and has a particle size of from about 20 to about 40 mesh size, said quartz sand is about 30% by weight having a purity of at least about 97% $SiO_2$ and has a particle size of from about 14 to about 35 mesh size, and said carbonaceous material is lampblack and is about 0.5% by weight of the weight of the magnesium-aluminate spinel aggregate and quartz sand admixture and has a particle size of about 100 μm.

9. The spout-filling composition of claim 1 wherein said magnesium-aluminate spinel aggregate is about 100% by weight and has a particle size of from about 8 to about 100 mesh size and said quartz sand is about 0% by weight of said first component and wherein said fine-mesh carbonaceous material has a particle size of about 100 μm.

10. A method of controlling discharge of metal melt from a metal-processing ladle comprising:
    filling a pouring spout of the ladle with a composition comprising a first component having from about 50% to about 100% by weight magnesium-aluminate spinel aggregate and from about 50% to about 0% by weight quartz sand, and a second component having fine-mesh carbonaceous material in an amount of from about 0.25% to about 5.00% by weight of the magnesium-aluminate spinel aggregate and quartz sand component;
    forming a cap at an interface of said composition and the melt to support said melt in the spout;
    moving a valve mechanism which covers the spout into an open position for discharging said melt; and
    rupturing said cap by discharge of said composition from below said melt.

11. The method of claim 10 wherein said magnesium-aluminate spinel aggregate is about 100% by weight and said quartz sand is about 0% by weight of said first component.

12. The method of claim 11 wherein said magnesium-aluminate spinel aggregate has a particle size of from about 6 to about 20 mesh size and wherein said fine-mesh carbonaceous material has a particle size of about 100 μm.

13. The method of claim 10 wherein said fine-mesh carbonaceous material is lampblack.

14. The method of claim 13 wherein said lampblack has a particle size of about 100 μm.

15. The method of claim 10 wherein said magnesium-aluminate spinel aggregate comprises from about 5% to about 95% by weight MgO and from about 95% to about 5% by weight $Al_2O_3$.

16. The method of claim 15 wherein said magnesium-aluminate spinel aggregate comprises from about 5% to about 30% by weight MgO and from about 95% to about 70% by weight $Al_2O_3$.

17. The method of claim 16 wherein said magnesium-aluminate spinel aggregate further comprises up to about 20% by weight CaO.

18. A spout-filling composition comprising:
    a first component having from about 50% to about 100% by weight magnesium-aluminate spinel aggregate said magnesium-aluminate spinel aggregate comprises about 10% by weight MgO, about 87% by weight $Al_2O_3$, and about 3% by weight CaO; and from about 50% to about 0% by weight quartz sand; and a second component having fine-mesh carbonaceous material in an amount of from about 0.25% to about 5.00% by weight of the magnesium-aluminate spinel aggregate and quartz sand component.

19. A spout-filling composition comprising:

a first component having about 100% by weight magnesium-aluminate spinel aggregate having a particle size of from about 8 to about 100 mesh size; and a second component having fine-mesh carbonaceous material having a particle size of about 100 μm in an amount of from about 0.25% to about 5.00% by weight of the magnesium-aluminate spinel aggregate.

20. A method of controlling discharge of metal melt from metal-processing ladle comprising:

filling a pouring spout of the ladle with a composition comprising a first component having about 100% by weight magnesium-aluminate spinel aggregate and a second component having fine-mesh carbonaceous material in an amount of from about 0.25% to about 5.00% by weight of the magnesium-aluminate spinel aggregate component;

forming a cap at an interface of said composition and the melt to support said melt in the spout;

moving a valve mechanism which covers the spout into an open position for discharging said melt; and rupturing said cap by discharge of said mass from below said melt.

* * * * *